Figure 1:
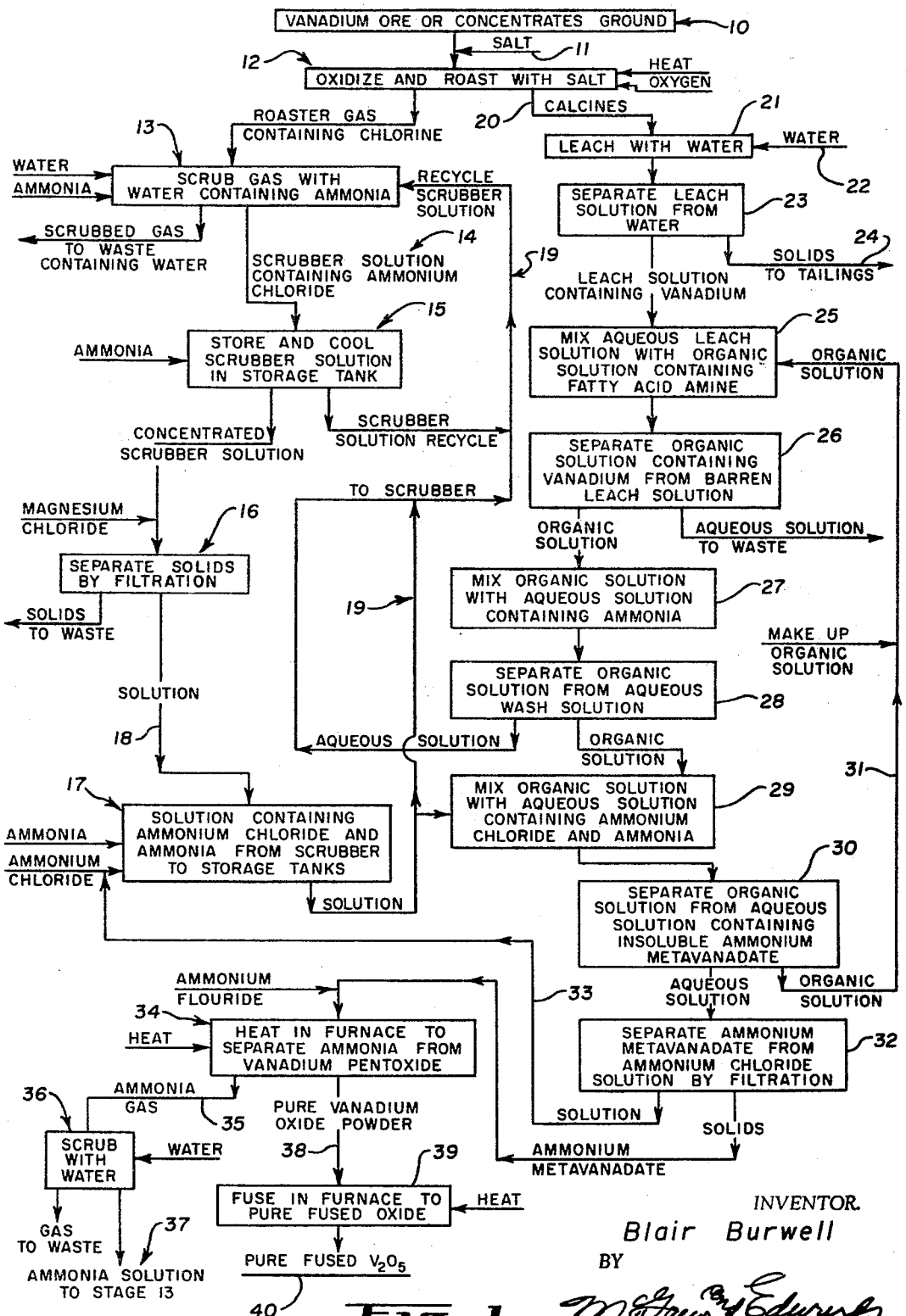

May 16, 1967     B. BURWELL     3,320,024

PROCESS OF RECOVERING HIGH PURITY VANADIUM COMPOSITIONS

Filed July 5, 1963

INVENTOR.
Blair Burwell
BY
ATTORNEYS

United States Patent Office 3,320,024
Patented May 16, 1967

3,320,024
PROCESS OF RECOVERING HIGH PURITY
VANADIUM COMPOSITIONS
Blair Burwell, P.O. Box 1951, Grand Junction,
Colo. 81501
Filed July 5, 1963, Ser. No. 292,979
10 Claims. (Cl. 23—18)

This invention relates to the treatment of low grade vanadium-bearing ores or concentrates for the direct recovery of vanadium oxide in a pure form containing in excess of 99.5% $V_2O_5$ and less than .05 phosphorous, .10 sodium and .01 percent each of iron and chromium, without the intermediate production and re-fining of impure red cake or fused oxide. This application is related to the copending applications of Burwell et al., Serial Nos. 141,340 and 141,500, filed September 28, 1961, now Patent No. 3,206,276 and No. 3,206,277 respectively, and features disclosed but not claimed herein are claimed in said applications.

In the treatment of ores or concentrates containing vanadium for the recovery of vanadium values, it has been the custom of the industry to crush the ores to a suitable fineness, such as less than minus 60 mesh, and to roast the ore or concentrates in suitable roasting furnaces with the addition of sodium salts, such as sodium carbonate, sodium sulfate or sodium chloride, at temperatures approximately of 800° C. whereupon a major portion of the vanadium contained in the ore is converted to a water-soluble salt, i.e., sodium vanadate. Upon subjecting the roasted material to a leaching step with water, the water-soluble sodium vanadate is separated from the residual solids and the residue discharged to tailings piles. Vanadium is contained in the alkaline extract solution as an anion with the valency of 5, together with other water soluble sodium compounds such as salt and sodium compounds of silica, phosphorous, arsenic, selenium, depending on the impurities in the ore.

Conventionally, the vanadium is recovered from this solution by subjecting the solution to boiling temperatures with the addition of mineral acids, whereupon an impure compound of vanadium known as "red cake" seperates from the solution as a solid and is removed by filtration. The remaining solution contains acid, sodium sulfate, sodium chloride, bound phosphorous and other impurities and is discharged to waste. The "red cake" is dried and heated to produce a product known as "fused oxide" containing 87% to 96% $V_2O_5$, the balance being impurities such as sodium, silicon, iron, sulphur, phosphorous and the like. A typical analysis of "red cake" and fused oxide is 87% $V_2O_5$, 9% $Na_2O$, .30% S, .05 P, .30 $SiO_2$. Material of this analysis finds a market in the ferro alloy industry where it is consumed principally in making ferro vanadium where iron, silica, soda, phosphorous impurities of these limits are not objectionable.

Recently, acid leaching with strong mineral acids such as sulfuric acid has been used on the residual solids from water-leached calcines, or on the ore, which extracts vanadium in the separated acidic solution usually in the valency of 4 as vanadyl sulfate, together with other acid soluble elements such as uranium, aluminum, iron, phosphorous, molybdenum, chromium, magnesium and silica. This acid extract media is then treated for the selective recovery of uranium by ion exchange or liquid solvent extraction. The vanadium content of these impure acidic solutions is recovered by a variety of methods, such as precipitation with alkaline ores or slimes and salt roasting-red cake recovery, or by solvent extraction after oxidization using trifatty amines or di-2 ethyl hexyl phosphoric acid, and an aqueous stripping agent of sodium carbonate, whereby the vanadium is recovered as a concentrated solution of sodium vanadate. This solution is then treated by acid and heating to make "red cake" and "fused oxide" containing 90 percent $V_2O_5$ and from 5 to 8 percent soda, or by oxidizing the acid leach solution and precipitating the vanadium as ferric vanadate by pH adjustment, separating and wasting the impure residual acid solution, and roasting the ferric vanadate with soda salts to form sodium vanadate, from which "red cake" and fused oxide was recovered by conventional means. State of Colorado Bulletin, "Colorado Vanadium," describes such practices.

The recovery of vanadium from acid solutions by liquid ion exchange and stripping with strong sulfuric acid followed by red cake precipitation is also described on page 119 of the State of Colorado bulletin and in the Journal of Metals, page 562, August 1961, "Extractive Metallurgy of Vanadium" by Burwell.

In the state of the art, as it has existed up to 1961 and as described in the foregoing description and references cited, the recovery of vanadium for conventional markets has been in the form of "red cake" and resulting fused oxide, which is consumed in the ferro alloy industry. In recent years, and especially in the past five years, there has been a growing use for pure vanadium oxide in the making of non-ferrous alloys, such as in metals containing titanium, chromium, vanadium and aluminum, where sodium, iron, silica and phosphorous content in the metal must be kept below the limits contained in conventional "red cake" or fused oxide. Usually this requires a pure vanadium oxide containing more than 99.5% $V_2O_5$ and less than .10% of each of sodium, and .25% of silica and less than .01% each of phosphorous, chromium and iron. Vanadium oxide of this purity has been obtained by purifying and re-refining the impure "red cake" output of conventional plants, by the use of ammonium chloride.

For instance, one method consists in mixing the "red cake" with a hot solution of sodium carbonate under oxidizing conditions whereby the vanadium redissolves as sodium vanadate and the largest part of the iron, silica, sulfur and other alkaline insoluble impurities remain in an insoluble form. The soluble vanadium is then separated from the insoluble impurities by filtration means in a concentrated solution containing usually about 8 percent $V_2O_5$. Ammonium cholride is then added to the filtered solution in sufficient quantity to form and precipitate ammonium metavanadate ($NH_4VO_3$) according to the reaction.

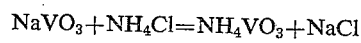

$$NaVO_3 + NH_4Cl = NH_4VO_3 + NaCl$$

Ammonium metavanadate is quite soluble in water, but becomes insoluble in ammonium chloride of increasing concentrations. After standing for a period of time varying from 8 to 24 hours, the resulting precipitate is separated by filtration means from the excess ammonium chloride solution and washed with cold water to remove soluble sodium salts. The pure salt is then dried and heated to expel ammonia, leaving pure $V_2O_5$. The aqueous solution containing excess ammonium chloride is usually wasted, as it is too dilute to reuse without expensive evaporation and purification of excess soda salts.

It is obvious that the production of high purity vanadium oxide by re-refining of red cake is involved and expensive because of the multiple batch steps, consumption of chemicals and loss of ammonium chloride. Usually the consumption of ammonium chloride is from 1 to 1.5 pounds per pound of $V_2O_5$ at a cost from 8 to 12 cents which, together with the cost of soda ash and labor, results in an added cost between 20 and 25 cents per pound of $V_2O_5$, which must be added to the cost of making red cake.

The present invention recognizes that a process is required which will recover a pure vanadium oxide compound from alkaline salt roast leach solutions without going through the intermediate steps of red cake precipitation and reprocessing as now required.

It is the object of this invention to provide such a process by the use of a series of new and novel related chemical processing steps which are carried out in continuous operation.

Another object of this invention is to provide a novel method for precipitating purified crystalline ammonium metavanadate quickly and completely in a three-phase mixture of a solvent extraction process, thereby permitting separation of the organic phase from the aqueous and solid phases, after which the purified crystalline product is separated by mechanical means from the aqueous phase.

A further object of my invention is to provide a novel procedure for effectively eliminating phosphorous impurities from ion exchange solutions before precipitating ammonium metavanadate in a three-phase mixture of an extraction process as a high purity compound.

Initially in the practice of my invention, it is desirable to treat the low-grade ore or concentrates to produce a solution containing sodium vanadate with a minimum of soluble silicon, iron, chromium and phosphorus. This is accomplished by grinding the ore to suitable fineness, usually less than 60 mesh, and roasting it with an alkali metal salt at temperatures approximately 800° C. for 1 to 2 hours under fully oxidizing conditions. Preferably, the roaster gases should be adjusted to contain in excess of 8% $O_2$ in order to fully oxidize ferric chloride to ferric oxide, calcium chloride to calcium oxide and to avoid the formation of soluble iron salts. Sodium chloride is the preferred alkali metal salt because it minimizes the formation of soluble sodium silicate, sodium aluminate, sodium chromate and sodium phosphate which are objectionable in subsequent steps of this process. The roasted ore is leached with water and the residue separated from the leach solution. The recovered leach solution generally has a pH of between 5.5 and 6.

The practice of my invention will be described with reference to the accompanying drawing, in which:

FIG. 1 is a flow sheet illustrating a typical circuiting arrangement for use with vanadium ores of varying impurity content.

Referring to the flow sheet FIG. 1, ground vanadium ore or concentrates may be treated, and after grinding to the size range stated above is discharged from a suitable storage container 10, such as ore bins, and as shown at 11 is mixed with salt in sufficient quantity to constitute the charge to a roasting stage 12.

The vanadium values of the ore or concentrates must be solubilized and extracted in the valency of 5 and maintained in anionic form in succeeding solution and purification steps. As many ores or concentrates or residues contain their values in a lower valency, they must first be oxidized to the valency of 5 before they can form water soluble anionic compounds free from contamination of iron, uranium, molybdenum, aluminum and other elements.

The preferred method of doing this now in general use is by the conventional salt roasting step of selected and favorable partially oxidized ores in which the oxidation of vanadium compounds to a +5 state is accompanied by the formation of a water soluble sodium vanadate. However, there are important quantities of ores or residues with large amounts of carbon or organic matter, as phosphate ores, flue ash or metallic compounds with iron such as ferrophosphorus, where the oxidation and forming of soluble sodium vanadate cannot be done economically in one step, requiring a preoxidation step before roasting with salt. The solubilization of vanadium values by forming water soluble sodium vanadate in salt roasting effects an important part of the extractive process in that chlorine is evolved in the reaction which can be recovered to produce an economical supply of ammonium chloride which is used as an essential part of the processing step.

I have found that if a roaster gas from salt roasting of vanadium ore (stage 12) is scrubbed with an aqueous solution containing ammonia of a pH not to exceed 5, as in stage 13, a substantially complete recovery of the chlorine contained in the roaster gas can be effected in the form of ammonium chloride passing from the scrubber 13 as scrubber solution 14.

The scrubber solution passes to a storage tank 15 in which the solution is cooled and the pH adjusted to 5 with ammonia and a portion of the solution containing ammonium chloride and ammonia recycled to the scrubber. The scrubber solution is thus recycled until the ammonium chloride is concentrated by the evaporation of water in the roaster gases to a desired strength between 20 and 25 percent. A portion of the scrubber solution thus concentrated is treated with magnesium chloride, if phosphorous bearing dust is contained in the roaster gases, and subjected to filtration in stage 16 to remove solids and impurities. The purified and concentrated ammonium chloride passes to a storage tank 17 through a pipe 18 where the ammonium content is adjusted to at least 9 and the ammonium chloride content is adjusted by circulating solution back to scrubber solution recycle 19. At the desire of the operator, solid ammonium chloride can be introduced to storage tank 17.

The calcines of the roasting stage 12 are discharged at 20 into a leaching stage 21 where the ore is leached with water introduced at 22 producing a leach solution having a pH between 5.5 and 6. The residue is separated from the leach solution by mechanical means at stage 23, preferably by filtration and the separated solids are passed to waste.

The leach solution is then intimately mixed at 25 with a water-insoluble, substituted amine complex dissolved in an organic solvent such as kerosene or fuel oil. This organic solution serves as a liquid-liquid solvent extraction agent. Various amine extractants which are capable of extracting anionic vanadium compounds from acid or alkaline liquors may be used in this step of the invention, such as tertiary amines containing aliphatic hydrocarbon groups of from approximately 8 to 10 carbon atoms of the structure:

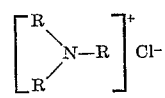

where R corresponds to the alkyl group found in naturally occurring fatty acids, or quaternary amines of similar alkyl groups formed by the methylation of the tertiary amine with the structure

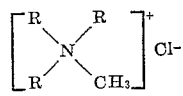

These amines are usually developed by manufacturers as derivatives of ammonia in which the alkyl groups of naturally occurring fatty acids replace three of the hydrogens of ammonia. They react with acids to produce hydrophobic salts, and because of the high molecular weight of the cation, they are active in mechanisms of ion exchange, particularly of the transition elements. They are supplied under trade names or numbers such as Alamine 336 (tertiary amine) and Aliquot (quaternary amine) by General Mills (Bulletin CDS-2-60) or as Adogen (Archer-Daniels-Midland) or Amberlite (Rohm & Haas). I have found the preferred amines are the quaternary amines for the reason that they are more selective in the loading of other interfering ionic species than the tertiary amines.

In the properly prepared neutral or alkaline leach solution, vanadium is present as a complex compound $Na_2V_2O_7$ with a divalent anion. Cationic metallic ions, such as uranium, iron, molybdenum, aluminum and magnesium usually present in acid leach liquors have been eliminated.

Upon mixing with a quaternary amine dissolved in an organic solution, the vanadium anion is extracted in step 25 probably as illustrated in the reaction:

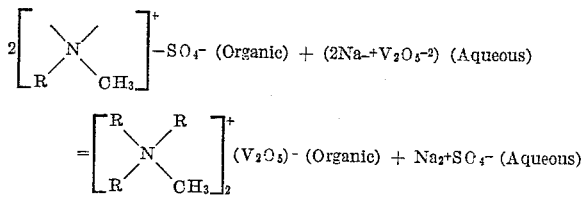

While sodium salt such as sodium chloride, sodium sulfate or other impurities of cationic compounds remain in the separated aqueous solution and are wasted.

After separating the organic phase containing the vanadium anion from the aqueous phase in step 26, the organic solution is preferably washed with water in step 27 to completely remove aqueous impurities such as sodium, and the aqueous wash solution is separated from the organic phase in step 28.

If substantial amounts of silica and phosphorous are present in the ores, a certain amount of these elements will be contained in the leach solution in an anionic form and will also be extracted into the organic solution as polyacid complexes. The illustrative reaction in the presence of silica is

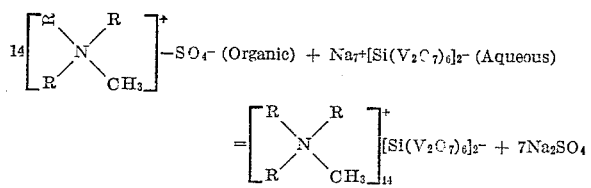

When phosphorous is present, the illustrative reaction is:

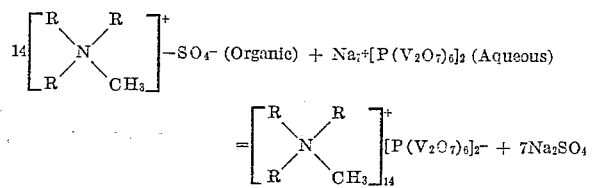

In order to achieve the object of the invention to recover the vanadium content in the organic in the solid phase as pure ammonium metavanadate, it is necessary to remove or control interfering anions of silica and phosphorous when they are present in substantial quantities. In the case of phosphorous, I have found that an aqueous ammonia solution reacts with the phosphorous content of the organo-phospho vanadate amine complex to form ammonium phosphate, which is extracted into the aqueous phase, leaving the vanadium anion in the organic solution according to the illustrative reaction

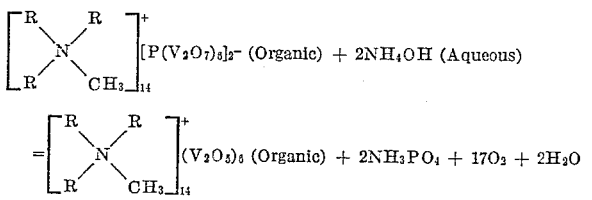

Referring to FIG. 1, in the practice of my invention, this step is easily accomplished by adding ammonia to the wash water of step 27 to establish a pH of at least 9.

The resulting mixture of organic and aqueous ammonia solution containing phosphorous is separated into an aqueous phase containing phosphorous and the organic phase containing the vanadium in step 28. The separated aqueous solution is then recycled through line 19 to scrubber 13 where the ammonia is consumed or wasted at the desire of the operator. The term ammonia as used in the herein specification and claims refers to both anhydrous ammonia and aqueous solutions of ammonia which will produce the desired pH. In this manner, the invention provides a flexible and easily controlled means of purification of solutions to meet changing ore conditions at the desire of the operator.

The organic phase containing the vanadium, extracted from the leach solution, which has been treated to remove phosphorous, is then treated for removal of its vanadium value. If properly carried out, in excess of 99% of the vanadium contained in the water solution will be transferred to the organic extract solution at stage 25. This is accomplished by using sufficient organic solution to react with all the vanadium in the aqueous solution. The amount required is generally determined by laboratory test methods preceding the operation. Usually, sufficient organic is supplied so that, after mixing, it will contain from 2.5 to 15 grams of $V_2O_5$ per liter, and the separated water solution from a trace to .1 gram $V_2O_5$ per liter. In this way, the vanadium oxide is transferred from its sodium-bearing molecule in the water solution to the water-insoluble organic phase as the vanadium amine complex.

I have found that the vanadium can be quickly and completely stripped as a crystalline ammonium metavanadate in the solid phase by mixing the loaded organic with a concentrated ammonium chloride solution, containing ammonia in which sufficient chlorine ions must be present to displace all the vanadium and silicon anions in the organic phase and form ammonium metavanadate in the aqueous extract. The ammonium metavanadate immediately precipitates as a crystalline product in the aqueous extract if sufficient excess ammonium chloride is present to form at least a 9% by weight solution of ammonium chloride, and if ammonia is present in sufficient amounts to maintain the aqueous extract at a pH of at least 8. The preferred concentrations in the aqueous extract solution expressed in free ammonia and ammonium chloride, are at 1% ammonia and 14% ammonium chloride, although concentrations greater than above can be used without loss at the will of the operator.

It is essential that the concentration of excess ammonium chloride in the stripping solution be held at such a point that immediate and complete precipitation of ammonium metavanadate in a crystalline form can be effected. If the concentration is below 9 percent, stripping is incomplete and precipitation is slow, due to supersaturation and the formation of colloidal ammonium metavanadate, which attaches itself to agitators, tanks and pipe lines as a crustation and cementation, thus rendering difficult if not impossible, the mechanical agitation and separation of the organic and liquid phases in the extraction. In addition, the precipitated ammonium metavanadate entrains quantities of the organic, causing losses and inefficiencies.

It is important that the solid ammonium metavanadate formed in the aqueous extract solution is sufficiently crystalline to permit quick separation from the organic-aqueous stripping mixture, and separation in the aqueous strip solution by settling. The proper practice of the stripping procedure will result in a practically complete stripping of the vanadium contained in the organic in from five to ten minutes, thus permitting continuous operation without storage or long standing.

As shown in the flowsheet No. 1, the concentrated ammonium chloride containing ammonia is accumulated in storage tank 17 from the recycled scrubber solution 19 in the scrubber stage 13, which has been purified in stage 16. The concentration of ammonium chloride in the solution in storage tank 17 can be maintained by recycling the solution to the scrubber stage 13 through line 19 where it is evaporated and concentrated, or, at the desire of the operator, the concentration may be maintained by adding solid ammonium chloride at 17. The ammonium content also can be adjusted to the optimum by ammonia addition in storage tank 17. The stabilized stripping solution from storage tank 17 is then mixed with the separated and purified organic solution containing vanadium passing from stage 28 for extraction of ammonium metavanadate in crystalline form at stage 29 as a component of a three phase mixture.

Following the formation of the three-phase mixture at stage 29, the mixture is passed to another treatment stage 30 in which the organic solution is separated from the aqueous ammonium chloride solution containing the ammonium metavanadate crystals. The separated organic solution is recycled through a line 31 as feed to stage 25 for mixing with aqueous leach solution containing sodium vanadate delivered from stage 23.

The aqueous stripping solution and ammonium metavanadate crystals from stage 30 are delivered into a separation stage 32, preferably a filtration stage in which the crystals and solution are separated. The separated ammonium chloride solution is recycled through a line 33 to storage tank 17 and together with the recycled solution from 18 constitutes the ammonium chloride input to stage 29.

The separated ammonium metavanadate at stage 32 may be dried and marketed as purified ammonium metavanadate or it may be heated to expel the ammonia and marketed as pure oxide containing more than 99.5% $V_2O_5$ and less than .10% sodium, .25% silica and less than .01% each of phosphorous, chromium, sulfur and iron. As shown in the flow sheet, FIG. 1, the ammonium metavanadate is delivered into a roaster 34 and discharged as pure vanadium oxide. The gas discharge of roaster 34 is discharged at 35 and may be wasted but preferably is recovered by subjecting it to a scrubbing operation with water in stage 36 to produce ammonium hydroxide solution to be recycled to stage 13. If it is desirable to convert the pure vanadium oxide powder from step 34 to pure fused oxide which does not dust in subsequent furnace operations, the vanadium oxide is conveyed to a fusion furnace 39 through a feeding screw 38 and it is subjected to sufficient heat in furnace 39 to melt and form pure fused vanadium oxide 40 of the same composition as the powder. If it is necessary or desirable to reduce the silica content below .25% for special uses, I have found that this can be accomplished by adding sufficient ammonium fluoride to the separated ammonium metavanadate passing to stage 34 so as to form $SiF_6$ with the silica content. Upon heating and drying, the silica is removed in the ammonium vapors.

As noted in the earlier description, it is desirable but not essential to maintain the concentration of ammonium chloride in excess of 14% so that a quick and complete extraction of the vanadium from the organic solution takes place. This is effected by replacing ammonia and chlorine in any convenient form in the recycled solution in the quantity consumed in the reaction of the previous cycle. Accordingly, the only consumption of ammonia and chlorine in this cyclic circuit is the ammonia contained in the ammonium metavanadate product and the chlorine required to displace the vanadium anion in the organic phase. The quantity of chlorine consumed in the reaction has been found to be .21 pound of $Cl_2$ per pound of $V_2O_5$ and .44 pound of $NH_3$ per pound of $V_2O_5$ recovered, which includes handling loss.

In the practice of my invention, the roasting of ore with salt makes available .37 pound of chlorine per pound of $V_2O_5$ recovered in the roaster gas and .19 pound of ammonia available in the ammonia driven off of the ammonium metavanadate in stage 34 of flow sheet 1. In the practice of my invention, with the cyclic resuse of stripping solution in the circuit and the additional recovery and cyclic reuse of chlorine and ammonia, it is possible for the operator to recover pure vanadium oxide with the addition to the circuit of ammonia only, which reduces the cost of chemicals accordingly.

The following Example 1 is respresentative of such preferred practice:

Five tons of oxidized vanadium-bearing concentrates containing 11.8% $V_2O_5$, 10.22% $Cr_2O_3$, 41.4% $P_2O_5$, 35.5% $Fe_2O$ were ground to minus 80 mesh and mixed with 30% sodium chloride. The mixture was then roasted in an excess of air for 30 minutes at a temperature of 780° C. The calcine was quenched with water and the vanadium-bearing solution separated by filtration from the solids. This solution contained 8.98% $V_2O_5$, 0.14% $P_2O_5$, trace $Cr_2O_3$ and trace FeO, and a pH of 7. Eighty-one percent of the vanadium in the concentrate was recovered in the solution. A portion of the solution was then treated for vanadium recovery as follows:

One hundred ml. of the solution was mixed with 1000 ml. of an organic solution for 10 minutes. This solution was made up of 10 parts of a mixture of modified tertiary alkyl amines, each having 3 saturated straight chains of 8 to 10 carbon atoms each, with 95% by weight of the mixture containing the 8 carbon length chains and 10 parts of isodecanol diluted with 80 parts of kerosene. The solutions were then settled and samples taken for an analysis. The aqueous solution assayed trace $V_2O_5$, trace $Cr_2O_3$ and 0.10 $P_2O_5$. The separated organic contained 0.89% of $V_2O_5$ and 0.004% $P_2O_5$. The separated organic solution was then mixed with 100 ml. of an ammonium hydroxide solution containing the equivalent of 1% $NH_3$ and the mixture settled. The organic phase was found to contain 0.89% $V_2O_5$ and no detectable phosphorus. The ammonia solution contained trace $V_2O_5$ and 0.04% $P_2O_5$.

The organic phase which was subjected to the ammonia water wash was then mixed with 100 ml. of solution containing 1% ammonia and 14% ammonium chloride for 10 minutes. The resulting mixture was settled and separated into an organic solution and an aqueous solution. The organic solution contained a trace of vanadium while the ammonia-containing solution contained a solid precipitate of white ammonium metavanadate. This was separated by filtration and solid ammonium chloride added until it contained 14% ammonium chloride, and sufficient ammonia gas introduced until it contained 1% of ammonium.

A series of 5 more portions of vanadium-bearing solution was then treated with the organic mixture in a cyclic manner as described above by reusing the organic phase, the ammonia wash liquor used to remove phosphorus, and the ammonia-ammonium chloride solution of the first run.

The ammonium metavanadate from the 6 cycle tests were combined and dried and calcined at 1300° C. The calcine weighed 53.4 grams and contained 99.98% $V_2O_5$, trace phosphorus, 0.01% sodium and trace chromium. The ammonia wash liquor contained 0.23% $P_2O_5$. Magnesium chloride was added to the solution and the solids separated by filtration. The separated ammonium wash solution contained a trace of phosphorous.

*Example 2*

An additional example is cited of the application of the preferred process in the treatment of a partially oxidized ore of vanadium containing vanadium in the valences of less than 4 as given by the following representative test.

A sample of vanadium-bearing concentrates from the phosphorous industry in Idaho containing 13.78 percent vanadium expressed as $V_2O_5$ was ground to minus 150 mesh with 40 percent by weight of salt and subjected to roasting for 30 minutes at 720° C., under oxidizing conditions. The ore contained vanadium in various valencies less than 4 and in the roasting operation, the heat evolved caused melting and fusion above 720° C.

The roasted ore was extracted with water and the residue contained 5.22 percent vanadium expressed as $V_2O_5$ or a recovery of 72 percent, which was unsatisfactory. The residue was found to contain vanadium in a valency of 4.

The residue was reroasted after mixing with salt and roasted at 800° C. for 30 minutes and leached as before. The leached residue contained 1.10% $V_2O_5$, and the total recovery was increased to 92 percent. The leach solution from roasting of this material contained the following analysis:

| | Grams per liter |
|---|---|
| $V_2O_5$ | 18.8 |
| $P_2O_5$ | 2.12 |
| $SiO_2$ | .105 |
| NaCl | 80 |

The solution was subjected to a continuous liquid ion exchange extraction circuit at the flow rate of 21 cc. per minute with 4 stages of countercurrent extractions with 27 cc. per minute of flow of an organic solution containing 88 percent by volume of kerosene, 3 volume percent of isodecanol solvent and 9 volume percent of a quaternary amine of natural occurring fatty acid sold under the trade name of "Aliquot 336" with the formula

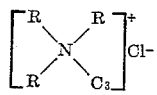

where R represents the alkyl group found in naturally occurring fatty acids.

The separated organic containing extracted vanadium was washed in a single step with 10 cc. per minute flow of ammonium hydroxide solution containing 10 grams per liter of ammonia which was recirculated. The washed organic was extracted with a flow of 10 cc. per minute of a solution containing 10 gr. per liter of ammonia and 150 grams per liter of ammonium chloride in a two-stage countercurrent flow. The separated organic was recycled to the circuit while the aqueous solution containing solid ammonium metavanadate was separated by filtration and the solids were washed and one part of ammonium fluoride to 200 parts of $V_2O_5$ was added and the precipitate heated to 600 degrees to expel ammonia. The resulting vanadium oxide analyzed:

| | Percent |
|---|---|
| $V_2O_5$ | 99.9 |
| P | 0.011 |
| $SiO_2$ | Trace |
| $SO_4$ | .006 |
| Na | .005 |
| K | .007 |

The separated ammonium chloride solution was recycled to reuse in stripping after adding sufficient ammonia and ammonium chloride to replace the amount used in the reaction. The amount thus added, expressed in ammonia and chlorine, was .44 gram of ammonia and .21 gram of chlorine per gram of $V_2O_5$ recovered. The separated aqueous leach solution was analyzed and found to contain .04 gram of $V_2O_5$ per liter and the recovery of the vanadium content in the organic exceeded 99.5 percent of the total vanadium in the leach solution.

*Example 3*

A sample of titaniferous magnetite from Africa was roasted with salt at 815 degrees centigrade after grinding to minus 100 mesh. The ore contained 1.60 percent vanadium expressed at $V_2O_5$, 55 percent iron as $Fe_2O_3$ and 11 percent titanium at $TiO_2$. The ore contained vanadium in the valency of 4.

The ore was subjected to a roasting step of 1 hour duration, of which 30 minutes were to oxidize the $V_2O_4$ $V_2O_5$. After leaching, 75 percent of the vanadium was contained in the separated leach solution which contained 19.5 grams of $V_2O_5$ per liter, 10 grams per liter of salt, trace phosphorous and .1 gram of $SiO_2$.

The aqueous leach solution was subjected to a cyclic liquid solvent extraction using an organic solution of the same composition as in Example 2, in a two-stage countercurrent organic extract circuit, one stage washing with water, and one stage stripping with a stripping solution containing 150 grams per liter of ammonium chloride and 10 grams per liter of ammonia. The organic solution was recycled and the aqueous stripping solution also recycled after the additions of ammonia and ammonium chloride consumed in the reaction, and the separation of the solid crystalline ammonium metavanadate. The separated ammonium metavanadate was dried and heated to form fused oxide, the analysis of which was:

| | Percent |
|---|---|
| $V_2O_5$ | 99.98 |
| $Na_2O$ | .01 |
| P | Trace |
| $SiO_2$ | .05 |

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

I claim:

1. In a process of recovering vanadium compounds in excess of 99.5% purity from vanadium ore or concentrates, including roasting such a vanadium-bearing material mixed with sodium chloride and in finely divided condition at a temperature of about 800° C. under oxidizing conditions so as to form sodium vanadate containing substantially no silicon, iron, chromium or phosphorus, leaching the roast calcine with water to extract vanadium as an anion with the valency of 5 and establishing a pH of about 5.5 to 7 in the leach solution, and filtering the leaching slurry for separation of the metal vanadate solution from insolubles, the improvement which comprises extracting the anionic vanadium oxide component of the sodium vanadate compound in the aqueous leach solution into a liquid-to-liquid ion exchange solution which consists of a water-insoluble amine complexing agent selected from the group consisting of tertiary and quaternary aliphatic amines having 8 to 10 carbon atoms dissolved in an organic solvent to obtain a two-phase liquid mixture, separating the organic phase from the aqueous phase containing metallic cationic impurities, extracting the vanadium ion from the separated organic phase by mixing with an aqueous solution containing not less than 9% ammonium chloride by weight and not less than 1% ammonia by weight to maintain a pH of at least 9 and thereby form a three-phase mixture of an organic phase, an aqueous phase containing ammonium chloride and ammonia, and a solid phase of crystalline ammonium metavanadate in the form of a slurry in said aqueous phase, separating the ammonium metavanadate from the aqueous phase by filtration, scrubbing the roaster gases with recycled aqueous solution having a pH not less than 5 and containing not less than 9% amonium chloride by weight and not less than 1% ammonia, thereby concentrating the ammonia chloride solution by evaporation, separating solids containing impurities from the conecntrated ammonium chloride solution, returning at least part of said concentrated ammonium chloride solution for forming the three-phase mixture after replacement of ammonia therein in a quantity at least equal to the amount consumed in a previous cycle, separating the precipitated ammonium metavanadate crystals from associated aqueous solution, and recycling the organic phase to the three-phase mixture stage after precipitating the ammonium metavanadate.

2. A process as defined in claim 1, in which the concentration of the ammonium chloride in the solution forming the three-phase mixture is about 14%.

3. A process as defined in claim 1, in which the ammonium chloride solution forming the three-phase mixture contains sufficient chlorine ions to displace all of the vanadium and silicon anions in the organic phase.

4. A process as defined in claim 1, in which the aqueous solution after ammonium metavanadate separation is returned for recycle into the ammonium chloride stripping solution after replacing the ammonia and chlorine therein in the amount consumed in the reaction of a previous cycle.

5. In a process of recovering vanadium compounds in excess of 99.5% purity from vanadium ore or concentrates, including roasting such a vanadium-bearing material mixed with sodium chloride and in finely divided condition at a temperature of about 800° C. under oxidizing conditions so as to form sodium vanadate containing substantially no silicon, iron, chromium or phosphorus, leaching the roast calcine with water to extract vanadium as an anion with the valency of 5 and establishing a pH of about 5.5 to 7 in the leach solution, and filtering the leaching slurry for separation of the metal vanadate solution from insolubles, the improvement which comprises adding ammonia to the aqueous leach solution to establish a pH of at least 9, extracting the anionic vanadium oxide component of the sodium vanadate compound in the aqueous leach solution into a liquid-to-liquid ion exchange solution which consists of a water-insoluble amine complexing agent selected from the group consisting of tertiary and quaternary aliphatic amines having 8 to 10 carbon atoms dissolved in an organic solvent to obtain a two-phase liquid mixture, separating the organic phase from the aqueous phase containing metallic cationic impurities, extracting the vanadium ion from the separated organic phase by mixing with an aqueous solution containing not less than 9% ammonium chloride by weight and not less than 1% ammonia by weight to maintain a pH of at least 9 and thereby form a three-phase mixture of an organic phase, an aqueous phase containing ammonium chloride and ammonia, and a solid phase of crystalline ammonium metavanadate in the form of a slurry in said aqueous phase, separating the ammonium metavanadate from the aqueous phase by filtration, scrubbing the roaster gases with recycled aqueous solution having a pH not less than 5 and containing not less than 9% ammonium chloride by weight and not less than 1% ammonia, thereby concentrating the ammonia chloride solution by evaporation, separating solids containing impurities from the concentrated ammonium chloride solution, returning at least part of said concentrated ammonium chloride solution for forming the three-phase mixture after replacement of ammonia therein in a quantity at least equal to the amount consumed in a previous cycle, separating the precipitated ammonium metavanadate crystals from associated aqueous solution, and recycling the organic phase to the three-phase mixture stage after precipitating the ammonium metavanadate.

6. In a process of recovering vanadium compounds in excess of 99.5% purity from vanadium ore or concentrates, including roasting such as vanadium-bearing material mixed with sodium chloride and in finely divided condition at a temperature of about 800° C. under oxidizing conditions so as to form sodium vanadate containing substantially no silicon, iron, chromium or phosphorus, leaching the roast calcine with water to extract vanadium as an anion with the valency of 5 and establishing a pH of about 5.5 to 7 in the leach solution, and filtering the leaching slurry for separation of the metal vanadate solution from insolubles, the improvement which comprises extracting the anionic vanadium oxide component of the sodium vanadate compound in the aqueous leach solution into a liquid-to-liquid ion exchange solution which consists of a water-insoluble amine complexing agent selected from the group consisting of tertiary and quaternary aliphatic amines having 8 to 10 carbon atoms dissolved in an organic solvent to obtain a two-phase liquid mixture, separating the organic phase from the aqueous phase containing metallic cationic impurities, extracting the vanadium ion from the separated organic phase by mixing with an aqueous solution containing not less than 9% ammonium chloride by weight and not less than 1% ammonia by weight to maintain a pH of at least 9 and thereby form a three-phase mixture of an organic phase, an aqueous phase containing ammonium chloride and ammonia, and a solid phase of crystalline ammonium metavanadate in the form of a slurry in said aqueous phase, separating the ammonium metavanadate from the aqueous phase by filtration, scrubbing the roaster gases with an aqueous solution containing ammonia having a pH not less than 5 to form ammonium chloride, recycling the ammonium chloride solution to the scrubber together with ammonia to maintain a pH of 5 and thereby evaporate and concentrate the ammonia chloride solution to at least 14%, purifying the concentrated ammonium chloride solution by additions of magnesium chloride and separation of solids containing impurities, recycling the separated aqueous stripping solution containing concentrated ammonium chloride to the concentrated ammonium chloride solution from the scrubber for concentration in the scrubber circuit, returning at least part of the purified ammonium chloride solution for forming the three-phase mixture after replacing the ammonia and ammonium chloride therein in the amount consumed in the reaction of a previous cycle, separating the precipitated ammonium metavanadate crystals from associated aqueous solution, and recycling the organic phase to the three-phase mixture stage after precipitating the ammonium metavanadate.

7. In a process of recovering vanadium compounds in excess of 99.5% purity from vanadium ore or concentrates, including roasting such a vanadium-bearing material mixed with sodium chloride and in finely divided condition at a temperature of about 800° C. under oxidizing conditions so as to form sodium vanadate containing substantially no silicon, iron, chromium or phosphorus, leaching the roast calcine with water to extract vanadium as an anion with the valency of 5 and establishing a pH of about 5.5 to 7 in the leach solution, and filtering the leaching slurry for separation of the metal vanadate solution from insolubles, the improvement which comprises extracting the anionic vanadium oxide component of the sodium vanadate compound in the aqueous leach solution into a liquid-to-liquid ion exchange solution which consists of a water-insoluble amine complexing agent selected from the group consisting of tertiary and quaternary aliphatic amines having 8 to 10 carbon atoms dissolved in an organic solvent to obtain a two-phase liquid mixture, separating the organic phase from the aqueous phase containing metallic cationic impurities, extracting the vanadium ion from the separated organic phase by mixing with an aqueous solution containing not less than 9% ammonium chloride by weight and not less than 1% ammonia by weight to maintain a pH of at least 9 and thereby form a three-phase mixture of an organic phase, an aqueous phase containing ammonium chloride and ammonia, and a solid phase of crystalline ammonium metavanadate in the form of a slurry in said aqueous phase, separating the ammonium metavanadate from the aqueous phase by filtration, scrubbing the roaster gases with recycled aqueous solution having a pH not less than 5 and containing not less than 9% ammonium chloride by weight and not less than 1% ammonia, thereby concentrating the ammonia chloride solution by evaporation, separating solids containing impurities from the concentrated ammonium chloride solution, replacing ammonia in said solution in a quantity at least equal to the amount consumed in a previous cycle, returning at least part of said concentrated ammonium chloride solution for forming the three-phase mixture, separating the precipitated ammonium metavanadate crystals from associated aqueous solution, recycling the organic phase to the three-phase mixture stage after precipitating the ammonium metavanadate, and recycling the separated aqueous solutions of the organic purification treatment and the ammonium metavanadate separation to the gas scrubbing circuit to maintain ammonium chloride concentration in excess of 14% and a pH of not exceeding 5 in the scrubber solution for recovery and concentration of the chlorine contained in the roaster gas for use in the process as concentrated ammonium chloride.

8. A process as defined in claim 7 in which some of the ammonium chloride solution not used in forming the three-phase mixture after ammonia replacement is recycled to the gas scrubbing circuit.

9. In a process of recovering vanadium compounds in excess of 99.5% purity from vanadium ore or concentrates, including roasting such a vanadium-bearing material mixed with sodium chloride and in finely divided condition at a temperature of about 800° C. under oxidizing conditions so as to form sodium vanadate containing substantially no silicon, iron, chromium or phosphorus, leaching the roast calcine with water to extract vanadium as an anion with the valency of 5 and establishing a pH of about 5.5 to 7 in the leach solution, and filtering the leaching slurry for separation of the metal vanadate solution from insolubles, the improvement which comprises extracting the anionic vanadium oxide component of the sodium vanadate compound in the aqueous leach solution into a liquid-to-liquid ion exchange solution which consists of a water-insoluble amine complexing agent selected from the group consisting of tertiary and quaternary aliphatic amines having 8 to 10 carbon atoms dissolved in an organic solvent to obtain a two-phase liquid mixture, separating the organic phase from the aqueous phase containing metallic cationic impurities, extracting the vanadium ion from the separated organic phase by mixing with an aqueous solution containing not less than 9% ammonium chloride by weight and not less than 1% ammonia by weight to maintain a pH of at least 9 and thereby form a three-phase mixture of an organic phase, an aqueous phase containing ammonium chloride and ammonia, and a solid phase of crystalline ammonium metavanadate in the form of a slurry in said aqueous phase, separating the ammonium metavanadate from the aqueous phase by filtration, scrubbing the roaster gases with recycled aqueous solution having a pH not less than 5 and containing not less than 9% ammonium chloride by weight and not less than 1% ammonia, thereby concentrating the ammonia chloride solution by evaporation, separating solids containing impurities from the concentrated ammonium chloride solution, returning at least part of said concentrated solution for forming the three-phase mixture after replacement of ammonia therein in a quantity at least equal to the amount consumed in a previous cycle, separating the precipitated ammonium metavanadate crystals from associated aqueous solution, recycling the organic phase to the three-phase mixture stage after precipitating the ammonium metavanadate, adding sufficient ammonium fluoride to the ammonium metavanadate to form $SiF_6$ with its silica content, and heating said crystals for removal of the silica in the ammonium vapors.

10. In a process of recovering vanadium compounds in excess of 99.5% purity from vanadium ore or concentrates, including roasting such a vanadium-bearing material mixed with sodium chloride and in finely divided condition at a temperature of about 800° C. under oxidizing conditions so as to form sodium vanadate containing substantially no silicon, iron, chromium or phosphorus, leaching the roast calcine with water to extract vanadium as an anion with the valency of 5 and establishing a pH of about 5.5 to 7 in the leach solution, and filtering the leaching slurry for separation of the metal vanadate solution from insolubles, the improvement which comprises extracting the anionic vanadium oxide component of the sodium vanadate compound in the aqueous leach solution into a liquid-to-liquid ion exchange solution which consists of a water-insoluble amine complexing agent selected from the group consisting of tertiary and quaternary aliphatic amines having 8 to 10 carbon atoms dissolved in an organic solvent to obtain a two-phase liquid mixture, separating the organic phase from the aqueous phase containing metallic cationic impurities, extracting the vanadium ion from the separated organic phase by mixing with an aqueous solution containing not less than 9% ammonium chloride by weight and not less than 1% ammonia by weight to maintain a pH of at least 9 and thereby form a three-phase mixture of an organic phase, an aqueous phase containing ammonium chloride and ammonia, and a solid phase of crystalline ammonium metavanadate in the form of a slurry in said aqueous phase, separating the ammonium metavanadate from the aqueous phase by filtration, scrubbing the roaster gases with recycled aqueous solution having a pH not less than 5 and containing not less than 9% ammonium chloride by weight and not less than 1% ammonia, thereby concentrating the ammonia chloride solution by evaporation, separating solids containing impurities from the concentrated ammonium chloride solution, returning at least part of said concentrated ammonium chloride solution for forming the three-phase mixture after replacement of ammonia therein in a quantity at least equal to the amount consumed in a previous cycle, separating the precipitated ammonium metavanadate crystals from associated aqueous solution, recycling the organic phase to the three-phase mixture stage after precipitating the ammonium metavanadate, and washing the organic solvent of the two-phase mixture with a liquid phase containing ammonia to establish a pH of at least 9 before it is delivered into the three-phase mixture stage.

References Cited by the Examiner

UNITED STATES PATENTS

| 3,206,276 | 9/1965 | Burwell et al. | 23—140 X |
| 3,206,277 | 9/1965 | Burwell et al. | 23—140 X |
| 3,259,455 | 7/1966 | Koerner et al. | 23—140 X |

OSCAR R. VERTIZ, *Primary Examiner.*

H. T. CARTER, *Assistant Examiner.*